United States Patent
Dhawane

(10) Patent No.: US 10,187,354 B2
(45) Date of Patent: Jan. 22, 2019

(54) DHCP CLIENT LEASE TIME BASED THREAT DETECTION FOR AUTHORISED USERS

(71) Applicant: Cisco Technology, Inc., San Jose, CA (US)

(72) Inventor: Ashishkumar Ramdas Dhawane, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 15/003,945

(22) Filed: Jan. 22, 2016

(65) Prior Publication Data

US 2017/0214657 A1   Jul. 27, 2017

(51) Int. Cl.
| | |
|---|---|
| *H04L 29/06* | (2006.01) |
| *H04L 29/12* | (2006.01) |
| *H04L 12/26* | (2006.01) |
| *G06F 17/30* | (2006.01) |

(52) U.S. Cl.
CPC .... *H04L 63/0236* (2013.01); *G06F 17/30368* (2013.01); *H04L 43/16* (2013.01); *H04L 61/2015* (2013.01); *H04L 61/2053* (2013.01); *H04L 61/6022* (2013.01); *H04L 63/0263* (2013.01); *H04L 63/1416* (2013.01); *H04L 63/1425* (2013.01); *H04L 61/103* (2013.01)

(58) Field of Classification Search
CPC ......... H04L 29/06; H04L 43/16; H04L 47/10; H04L 47/28; H04L 63/20; H04L 63/0236; H04L 67/22; H04L 67/42; H04L 67/325
See application file for complete search history.

(56) References Cited

U.S. PATENT DOCUMENTS

| | | | | |
|---|---|---|---|---|
| 7,779,093 B1* | 8/2010 | Zhang | ............... | H04L 29/12283 709/220 |
| 8,086,732 B1* | 12/2011 | Volz | .................... | H04L 61/2015 709/200 |
| 2005/0086364 A1* | 4/2005 | Muti | ...................... | H04L 29/06 709/235 |
| 2005/0086502 A1* | 4/2005 | Rayes | ..................... | H04L 63/20 713/189 |
| 2006/0010318 A1* | 1/2006 | Coley | ................. | H04L 63/0236 713/150 |
| 2006/0050692 A1* | 3/2006 | Petrescu | ................. | H04L 29/06 370/389 |
| 2008/0065747 A1* | 3/2008 | Kubota | ............... | H04L 29/1282 709/220 |
| 2016/0112242 A1* | 4/2016 | Chanukaev | ......... | H04L 12/2859 709/226 |

* cited by examiner

*Primary Examiner* — Joseph P Hirl
*Assistant Examiner* — Kalish K Bell
(74) *Attorney, Agent, or Firm* — Merchant & Gould P.C.

(57) ABSTRACT

Methods and systems are provided for determining a leased time for an address leased for a first user device. The determined leased time and leased address may be stored in a first database. Upon receiving a renew/rebind request from the first user device, a request counter in the first database may be increased if the renew/rebind request occurs during the leased time. A MAC address and port number associated with the address may be identified as performing unwanted actions if the request counter crosses a first threshold. After the request counter crosses the threshold a first remedial action may be taken on the first user device associated with the MAC address and port number identified as performing unwanted actions.

19 Claims, 5 Drawing Sheets

| MAC | IP | PORT | LEASED TIME | REQUEST COUNTER |
|---|---|---|---|---|
| A | B | 1 | 3600s | 0 |
| C | D | 2 | 3600s | 0 |
| E | F | 3 | 3600s | 3 |
| G | H | 4 | 3600s | 0 |

FIG. 2

DHCP CLIENT LEASE TIME BASED THREAT DETECTION FOR AUTHORISED USERS

TECHNICAL FIELD

The present disclosure relates generally to identify authorized clients performing unwanted actions in a network environment.

BACKGROUND

In enterprise networks it may be determined whether users are directly connected to the switch via authentication mechanisms. Authentication mechanisms may include dot1x (such as IEEE 802.1X port-based authentication), MAC Authentication Bypass (MAB) protocol, or other web-based authentications on wired or wireless ports. DHCP servers may be provided to provide authenticated users with leased out IP addresses.

However, in such environments, a switch may only be acting as a DHCP server and/or relay. Accordingly the switch may not maintain any lease time related information. Such lease time related information may be needed for to detect threats to the network. This may become an issue when a number of network device start behaving wrongly. For example, a network device may start a renewing and rebinding IP addresses over and over again despite the existence of remaining DHCP lease time on an original IP address.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 2 shows a threat detection database 200 according to embodiments of the present disclosure.

DETAILED DESCRIPTION OF EXAMPLE EMBODIMENTS

Overview

Figure 1:
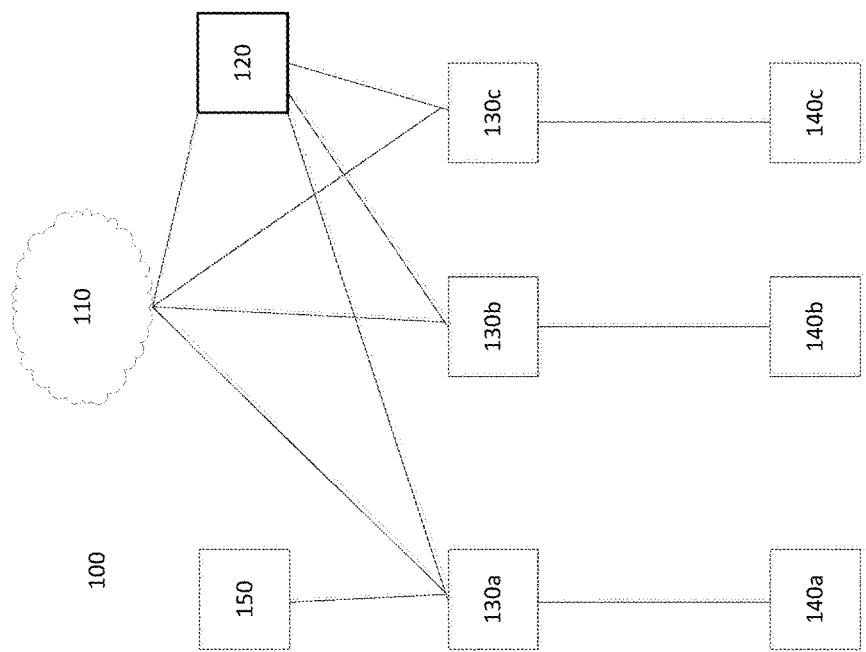
FIG. 1 illustrates an operating environment for embodiments of the present disclosure.

Methods and systems are provided for determining a leased time for an address leased for a first user device. The determined leased time and leased address may be stored in a first database. Upon receiving a renew/rebind request from the first user device, a request counter in the first database may be increased if the renew/rebind request occurs during the leased time. A MAC address and port number associated with the address may be identified as performing unwanted actions if the request counter crosses a first threshold. After the request counter crosses the threshold a first remedial action may be taken on the first user device associated with the MAC address and port number identified as performing unwanted actions.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Both local and remote DHCP servers may be employed to lease out IP addresses to network user devices. For example, in an enterprise environment, user devices may be authenticated using RADIUS/ISE. After authentication, an IP address may be leased out to a user device. However, in some instances the leased IP address may be fluctuated for a user device. For example, the leased IP address may be renewed and another IP address may be issued and bound to the user device. In some embodiments, this may be due to firmware issues in third party network devices.

Without a mechanism to detect such a threat to authorized user devices, when a number of network devices start operating in such a manner, even though the device's leased IP addresses have additional DHCP lease time, the IP addresses may be renewed and bound over and over again. When IP addresses are fluctuating in this manner, any client based policies that employ the IP address in their calculations must be recompiled and reloaded into the TCAM. Many policies require compilation and merging at the software level which can be an expensive procedure (in both time and computing power). If the firmware for multiple network devices starts operating in this fashion for a period of time, excessive switch CPU cycles may be used, preventing efficient operation of other services handled by the switch CPU.

In some embodiments, a monitoring server may be employed to survey network devices and search for equipment performing unwanted actions. However, by the time a monitoring server identifies the problem, the damage may already have been done, and the switch may be exposed to the threat caused by malicious user devices.

User devices performing unwanted actions may employ renew/rebinding techniques to implement a DHCP consumption attack. The intent of a DHCP consumption attack is for an attacker to prevent hosts from gaining access to the network by denying them an IP address by consuming all of the available IP address in a DHCP pool.

Many switches use a TCAM for Layer 2 switching. As frames arrive on switch ports, the source media access control addresses (MAC addresses) can be learned and recorded in the TCAM table. Each MAC address may be a unique identifier assigned to a network device for communications on the network. In other words, each MAC address may identify an authorized client on the network. The port of arrival and the VLAN may both be recorded in the table, along with a time stamp. If a MAC address learned on one switch port has moved to a different port, the MAC address and time stamp are recorded for the most recent arrival port. Then, the previous entry is deleted. In some embodiments, if a MAC address is found already present in the table for the correct arrival port, only its time stamp may be updated.

Each scenario is run once with the IP address coming from the DHCP server and once using a static IP address from the same subnet as the IP address in the DHCP server's pool. The outcome of the DHCP consumption attack may be the same no matter if an IP address is used from the DHCP server or a static IP address is used.

DHCP snooping is a security feature capable of intercepting DHCP messages crossing a switch and blocking bogus DHCP offers. DHCP snooping may use the concept of trusted and untrusted ports. Typically, the trusted ports are used to reach DHCP servers or relay agents, while untrusted ports are used to connect to clients. All DHCP messages are allowed on trusted ports, while only DHCP client messages are accepted on untrusted ports. For DHCP snooping to function properly, all DHCP servers must be connected to the switch through trusted interfaces.

Prior approaches to handle DHCP DOS attacks and prevent running out of available DHCP IP addresses to provide authorized user devices (such as DHCP snooping) may be solely based on the DHCP address perspective. Embodiments of the present disclosure solve these problems by determining fluctuations of IP address usage over a period of time. Present embodiments may automatically avoid a large scale impact on the switch caused by the constant compiling of client policies and TCAM address loading that eats up CPU resources.

Embodiments of the present disclosure may employ a database containing lease times for each leased address along with a request counter to count the number of renew/rebinding request received during the active lease time. Updating and monitoring this database allows for robust threat detection not provided in prior systems. In some embodiments, the employed database may be enhanced and merged with existing DHCP and IPDT tables to increase the amount of information available for threat detection.

Embodiments of the present disclosure expand upon ELOAM to provide the prediction of a possible degradation of an Ethernet link prior to reaching error thresholds. This allows corrective measures to be employed prior to link breakdown. Avoiding link breakdowns may be especially important in the context of 100G and 400G Ethernet connections carrying large amounts of data.

FIG. 1 illustrates an operating environment 100 for embodiments of the present disclosure. Operation environment 100 may be representative of an enterprise network environment. A DHCP server 120 may be a network device that controls the assignment of IP addresses of user devices of the enterprise environment. In some embodiments, DHCP server 120 may be connected to a broader network 110, such as the Internet.

A number of user devices may wish to have access to the enterprise network, such as user devices 140a, 140b, and 140c. These user devices may communicate with DHCP server 120 through switches 130a, 130b, and 130c respectively. The user devices may first request authentication from an authentication, authorization, and accounting (AAA) server device 150. After authentication, DHCP server 120 may communicate a leased IP address and corresponding lease time to a requesting user device. The corresponding lease time and IP address may be trapped by the switch associated with the user device, and the switch may store this information in a threat detection database 200 as discussed below. The leased IP address may allow the user device direct communication with broader network 110.

FIG. 2 shows a threat detection database 200 according to embodiments of the present disclosure. Threat detection database 200 may contain a number of entries, each corresponding to an IP address assigned to a MAC address associated with a client as provided by a DHCP server. A MAC column 210 in threat detection database 200 may contain the MAC addresses. An IP address column 220 in threat detection database 200 may contain the IP addresses assigned to each corresponding MAC address.

Next, port column 230 in threat detection database 200 may contain the port numbers identifying the port through which the IP address connections are made. A leased time column 240 in threat detection database 200 may contain the amount of leased time provided for each leased IP address. In the present example, each leased time is set at 3600 seconds.

Threat detection database 200 may contain a request counter column 250. Request counter column 250 may indicate the number of renew/rebinding request received during the active lease time for the particular MAC address IP address combination. The value of request counter column 250 may be increased incrementally each time an additional renew/rebinding request is received during the active lease time for the particular MAC address IP address combination. Finally, threat detection database 200 may contain a threshold column 260. Threshold column 260 may contain a value indicative of the threshold, that when exceeded by the request counter may trigger remedial action.

Figure 3:
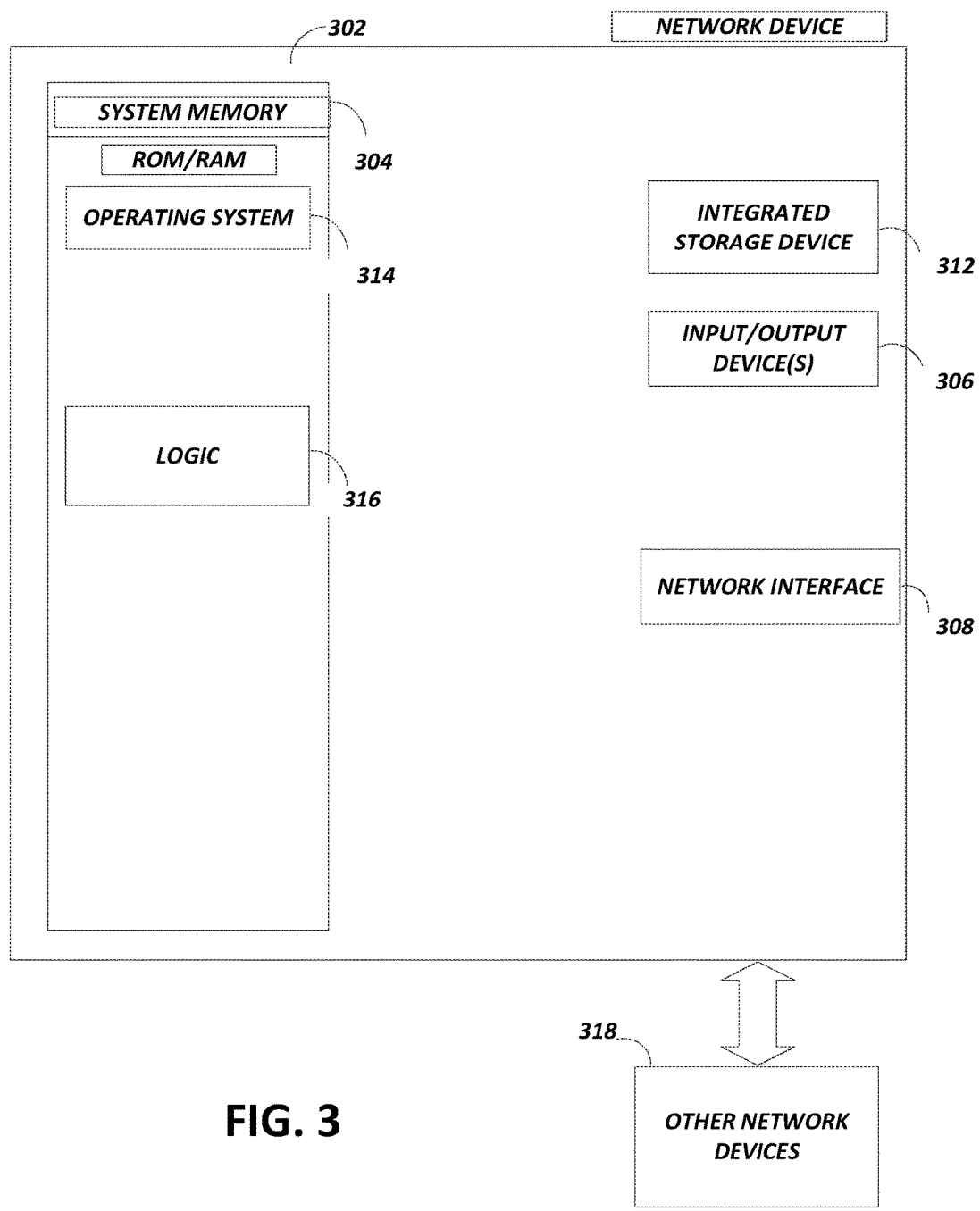
FIG. 3 is a system diagram of a network device operable with embodiments of the present disclosure.

FIG. 3 shows a network device, such as a router, switch, fabric edge device, or any other network device that may employ embodiments of the present disclosure in greater detail. The network device may include at least a processing device 302, a memory 304, input/output (I/O) devices 306, and a network interface 308, each of which is communicatively coupled via a local interface 310. The MAC tables may be located within memory 304. Processing device 302 may be a hardware device for executing software, particularly that which is stored in memory 304. Processing device 302 may be any custom made or commercially available processor, a central processing unit (CPU), an auxiliary processor among several processors associated with a content server, a semiconductor-based microprocessor (in the form of a microchip or chip set), a microprocessor, or generally any device for executing software instructions. The forwarding engine may be implemented by processing device 302.

I/O devices 306 may include input devices, for example but not limited to, a keyboard, mouse, scanner, microphone, etc. Furthermore, the I/O devices 306 may also include output devices, for example but not limited to, a printer, display, etc.

Network interface 308 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

Local interface 310 may be, for example but not limited to, one or more buses or other wired or wireless connections. Local interface 310 may have additional elements, which are omitted for simplicity, such as controllers, buffers (caches), drivers, repeaters, and receivers, to enable communications. Further, local interface 310 may include address, control, and/or data connections to enable appropriate communications among the aforementioned components and provides the interface to communicate with processing device 302.

In some embodiments, the network device may further be configured with an integrated storage device 312 coupled to local interface 310. Storage device 312 may be configured to store a plurality of content chunks. In some embodiments, storage device 312 may be used for storage of one or more MAC tables or mapping tables.

Memory 304 may include a suitable operating system (O/S) 314. Operating system 314 essentially may control the execution of other computer programs, such as scheduling, input-output control, file and data management, memory management, and communication control and related services. Logic 316 may include executable code to send TLVs to other network devices.

Memory 304 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 304 may incorporate electronic, magnetic, optical, semi-conductive, and/or other types of storage media. Note that memory 304 may have a distributed architecture, where various components are situated remotely from one another, which can be accessed by the processing device 302.

The software in memory 304 may include one or more separate programs, each of which comprises an ordered listing of executable instructions for implementing logical functions. In the embodiment shown, the software in memory 304 may include operating system 314 and logic 316, as explained above. Functionality of logic 316 may be implemented using a single module, or distributed among a plurality of modules.

When logic 316 is in operation, processing device 302 may be configured to execute logic 316 stored within memory 304, to communicate data to and from memory 304, and to generally control operations of logic 316. Logic 316 and O/S 314, in whole or in part, but typically the latter, are read by processing device 302, perhaps buffered within processing device 302, and then executed.

The network device may include a communication interface suitable for enabling communication (e.g., TCP/IP) with other network devices, and for receiving and processing forwarding requests to provide overlay communication services to a switch. For instance, communication interface may be of a type suitable for communication over an IP network, a coaxial cable network, an HFC network, and/or wireless network, among others.

A communications port (or ports) may further be included in the network device for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.).

Figure 4:
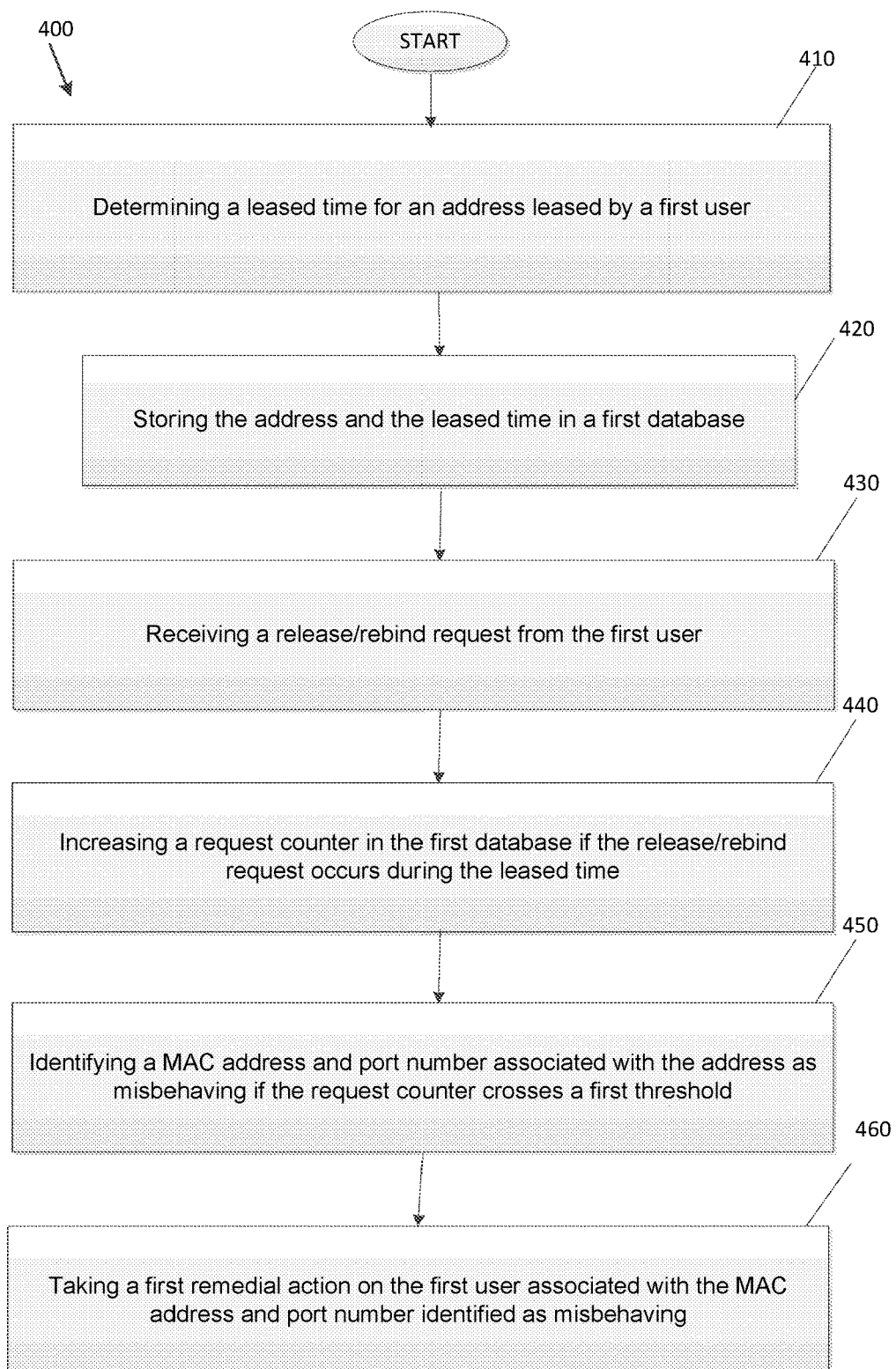
FIG. 4 is a flow chart illustrating embodiments of the present disclosure.

FIG. 4 is a flow chart illustrating certain embodiments of the present disclosure. Method 400 may begin at step 410 where a leased time may be determined for an address leased for a first user device. For example, a user device(client) on an enterprise network may request the lease of an IP address from a DHCP server. The DHCP server may first authenticate the user device and then assign an IP address to a MAC address corresponding to the user device. Each IP address assigned by the DHCP server may have an associated lease time during which the IP address will be valid for the authorized user device. The lease time may be trapped per MAC address as it is transmitted from the DHCP server.

Next, method 400 may proceed to step 420. At step 420, the address and the leased time may be stored in a first database. In some embodiments, the first database may be acted on by the DHCP server responsible for assigning the address and associated lease time. In other embodiments, the first database may be maintained in a network device remote from the DHCP server. The format of the first database may be similar to the format of threat detection database 200.

At step 430, a renew/rebind request may be received from the first user device. In some embodiments, this request may come from firmware. The renew/rebind request may take the form of a DHCPREQUEST message that identifies the user device and the affected lease. The request may be sent as a unicast message directly to the DHCP server. In some embodiments, the user device may request a new lease length. Next, at step 440, a request counter in the first database may be increased incrementally if the renew/rebind request occurs during the leased time. The request counter may be stored in threat detection database 200 in request counter column 250.

At step 450, the MAC address and port number associated with the address in threat detection database 200 may be identified as performing unwanted actions if the request counter crosses a first threshold. The first threshold may be set by a system operator and may be variable during network operation. In some embodiments, the first threshold may be increased or decreased based on enterprise network conditions. For example, it may be determined that the user device requests are legitimate as opposed as an indicator of malicious user devices.

Finally, at step 460, taking a first remedial action on the first user device associated with the MAC address and port number identified as performing unwanted actions. In some embodiments of the present disclosure, the MAC address and port number associated with the address are also stored in threat detection database 200. In some embodiments, threat detection database 200 may be merged with a DHCP table and an IP Device Tracking (IPDT) table to provide for more robust detection techniques.

The first remedial action could be one of a number of different actions. For example, the first remedial action may comprise throttling DHCP control traffic on a port identified by the port number identified as performing unwanted actions. This may be achieved through a call admission control (CAC) kick. In some embodiments, the first remedial action may comprise enabling storm control for DHCP control traffic on a port identified by the port number identified as performing unwanted actions. In some embodiments, the first remedial action may comprise shutting down a port identified by the port number identified as performing unwanted actions. In some embodiments, the first remedial action may comprise taking remedial actions directly on the MAC address. These remedial actions are illustrative of only some of the actions that may be taken when a malicious user device is identified and should not be viewed at as limiting.

Figure 5:
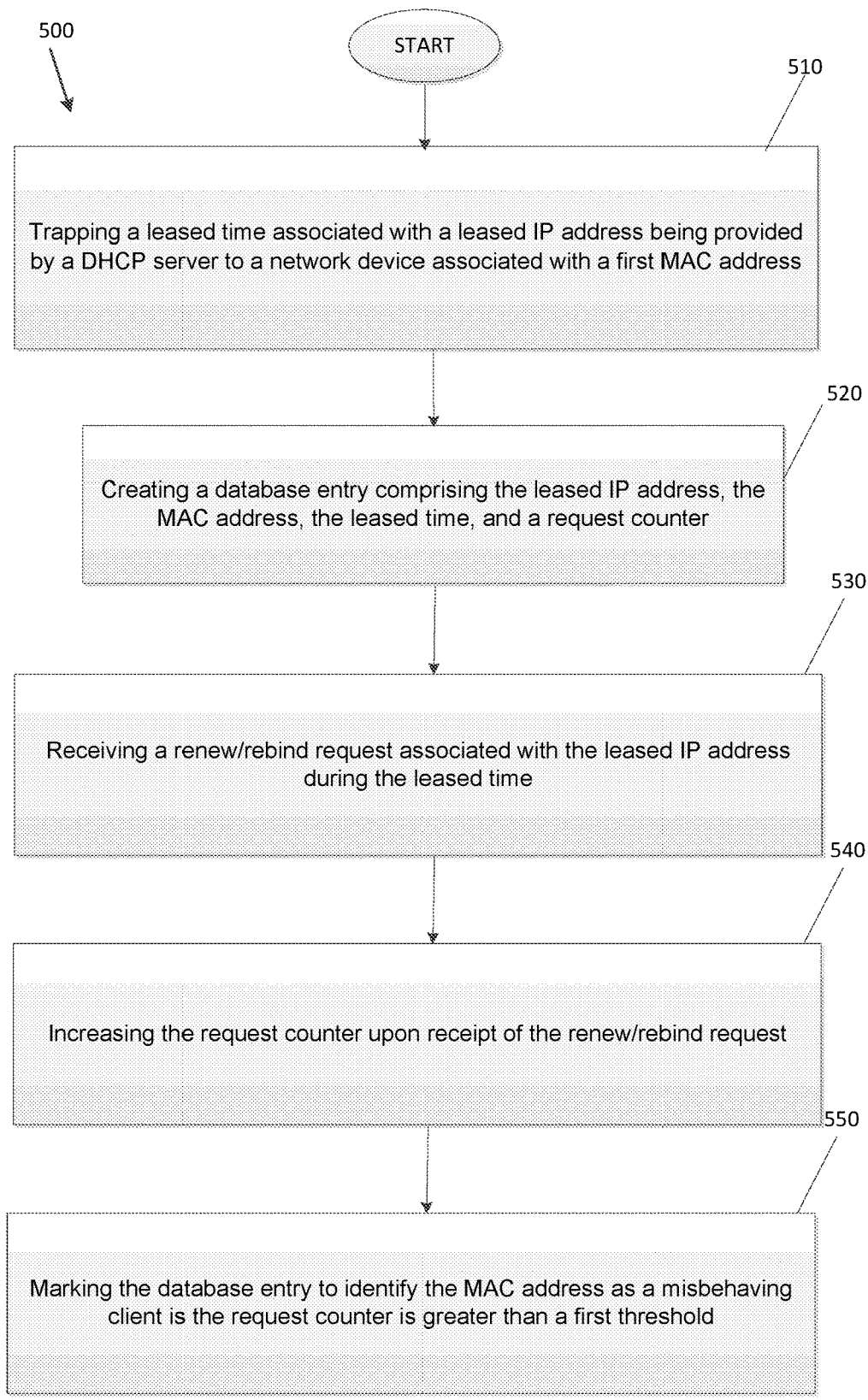
FIG. 5 is a flow chart illustrating embodiments of the present disclosure.

FIG. 5 is a flow chart illustrating certain embodiments of the present disclosure. Method 500 may start at step 510 where a leased time may be trapped, where the leased time is associated with a leased IP address being provided by a DHCP server to a network device associated with a first MAC address. The network device may be associated with a user device (or client) interacting with an enterprise network. The DHCP server may be responsible for assigning IP addresses to such user devices once the user devices are authorized by any number of authorization techniques. In some embodiments, the DHCP server and the network device may be part of an enterprise network.

Next, method 500 may proceed to step 520. At step 520, a database entry may be created comprising the leased IP address, the MAC address, the leased time, a request counter, and an associated threshold value. The database entry may be one of any number of entries in a database, such as threat detection database 200. In some embodiments, each entry in the threat detection database 200 may further comprise a port number associated with the leased IP address. In some embodiments, the database entry may be stored remote from the DHCP server. In some embodiments, the database entry may be merged with a preexisting IPDT table.

Method 500 may then proceed to step 530. At step 530, a renew/rebind request associated with the leased IP address may be received during the leased time. Upon receipt of such a renew/rebind request, method 500 may proceed to step 540. At step 540, the request counter may be increased upon receipt of the renew/rebind request.

Finally, method 500 may proceed to step 550. At step 550, the database entry may be marked to identify the MAC address as a client performing unwanted actions if the request counter is greater than a first threshold. In some embodiments of the present disclosure, remedial action may be taken when the client performing unwanted actions is identified. In embodiments, the remedial action may comprise one of: throttling DHCP control traffic, enabling storm control, and shutting down a port associated with the leased IP address.

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit embodiments to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

I claim:

1. A method comprising:
   determining a leased time for an address leased for a first user device;
   storing the address and the leased time in a first database;
   receiving a renew/rebind request from the first user device;
   increasing a request counter in the first database if the renew/rebind request occurs during the leased time;
   identifying a MAC address and port number associated with the address as performing unwanted actions if the request counter crosses a first threshold;
   taking a first remedial action on the first user device associated with the MAC address and port number identified as performing unwanted actions, wherein taking the first remedial action comprises throttling DHCP control traffic on a port identified by the port number identified as performing unwanted actions; and
   merging the first database with a DHCP table and an IP Device Tracking (IPDT) table.

2. The method of claim 1, further comprising: determining the leased time per MAC address associated with an IP address leased for the first user device, wherein the IP address is assigned to the first user device.

3. The method of claim 1, wherein the MAC address and port number associated with the address are stored in the first database.

4. The method of claim 1, wherein the first remedial action comprises enabling storm control for DHCP control traffic on a port identified by the port number identified as performing unwanted actions.

5. The method of claim 1, wherein the first remedial action comprises shutting down a port identified by the port number identified as performing unwanted actions.

6. The method of claim 1, wherein the first remedial action comprises taking remedial actions directly on the MAC address.

7. The method of claim 1, further comprising: increasing the first threshold based on enterprise network conditions.

8. A method comprising:
trapping a leased time associated with a leased IP address being provided by a DHCP server to a network device associated with a first MAC address;
creating a database entry comprising the leased IP address, the MAC address, the leased time, and a request counter; receiving a renew/rebind request associated with the leased IP address during the leased time;
increasing the request counter upon receipt of the renew/rebind request;
marking the database entry to identify the MAC address as a client performing unwanted actions if the request counter is greater than a first threshold;
taking a first remedial action on the first user device associated with the MAC address identified as the client performing unwanted actions, wherein taking the first remedial action comprises enabling storm control for DHCP control traffic on a port identified by the MAC address identified as the client performing unwanted actions; and
merging the first database with a DHCP table and an IP Device Tracking (IPDT) table.

9. The method of claim 8, wherein the database entry further comprises a port number associated with the leased IP address.

10. The method of claim 8 wherein the database entry is stored remote from the DHCP server.

11. The method of claim 8, wherein the DHCP server and the network device are part of an enterprise network.

12. The method of claim 8, wherein the remedial action further comprises one of: throttling DHCP control traffic and shutting down a port associated with the leased IP address.

13. A system comprising:
a memory; and
one or more processors configured to execute instructions stored in the memory, the instructions comprising:
determining a leased time for an address leased for a first user device;
storing the address and the leased time in a first database;
receiving a renew/rebind request from the first user device;
increasing a request counter in the first database if the renew/rebind request occurs during the leased time;
identifying a MAC address and a port number associated with the address as performing unwanted actions if the request counter crosses a first threshold;
taking a first remedial action on the first user device associated with the MAC address and port number identified as performing unwanted actions±wherein taking the first remedial action comprises shutting down a port identified by the port number identified as performing unwanted actions; and
merging the first database with a DHCP table and an IP Device Tracking (IPDT) table.

14. The system of claim 13, wherein the first remedial action further comprises throttling DHCP control traffic on a port identified by the port number identified as performing unwanted actions.

15. The system of claim 13, wherein the first remedial action further comprises enabling storm control for DHCP control traffic on a port identified by the port number identified as performing unwanted actions.

16. The system of claim 13, wherein the address is leased by a DHCP server to the first user device.

17. The system of claim 16, wherein the DHCP server and the first user device are part of an enterprise network.

18. The system of claim 16, wherein the instructions further comprising: increasing the first threshold based on enterprise network conditions.

19. The method of claim 8, further comprising: increasing the first threshold based on enterprise network conditions.

* * * * *